3,098,035
SLIME CONTROL IN HEAVY-MEDIA
ORE SEPARATION
Frank F. Aplan, Warwick, N.Y., assignor to Union
Carbide Corporation, a corporation of New York
No Drawing. Filed July 25, 1960, Ser. No. 44,887
2 Claims. (Cl. 209—5)

The present invention relates to a process for the separation of heterogeneous materials having components of different specific gravities by floating or sinking the components of the materials in liquids or suspensions and, more particularly, processes for heavy-media separation in the presence of slime-forming materials.

Separation of materials possessing different specific gravities by introducing them into liquid having specific gravities intermediate between the specific gravity of the materials to be separated has been practiced in the laboratory for many years. The practice is commonly called heavy-liquid separation. The heavy-liquids used in the laboratory included zinc-chloride, calcium chloride, carbon tetrachloride, acetylene tetrabromide, methylene iodide and aqueous solutions of thallium malonate and formate.

The depletion of high grade mineral deposits and the discovery of many low-grade metallic and non-metallic mineralogical deposits led artisans to a search for beneficiation methods suitable for utilization in the treatment of these low-grade deposits. Heavy-liquid separation promised to provide the solution to the problem of treating large amounts of material having components differing in specific gravity.

Commercial application of the laboratory principle of heavy-liquid separation was utilized at least as early as 1936 in the beneficiation of zinc ores. Since that time the use of the process has expanded to many fields requiring the separation of materials of different densities from large amounts of starting materials. Coal, iron ore, zinc-lead ores, fluorspar, tin ore, diamondiferous ore, magnesite, dolomite, chrome ore, andalusite, manganese ore, brucite and gravel are examples of materials presently being commercially treated by the process utilizing the principle of heavy-liquid separation.

In the commercialization of the laboratory heavy-liquid separation principle, a need developed for more economical separation mediums. Heavy-density mediums were developed to meet the need.

Heavy-density mediums are comprised essentially of an aqueous suspension of solid particles such as galena, magnetite, fluorspar, hematite, iron oxide, barite, pyrolusite, pyrites, hammer scale, sea sand, comminuted and shotted ferrosilicon, loess and others. The density of such a medium can be controlled by controlling the weight ratio of particles to water.

For convenience of expression, the term "heavy-medium" will be construed herein to include both heavy-liquid and heavy density mediums and the term "heavy-media separations" will be construed herein to include both heavy-liquid separations and heavy-density separations.

Heretofore, the term "heavy-liquid" has commonly been utilized to identify heavy liquids such as zinc and calcium chloride and such organic liquids as pentachlorethane and tetrabromethane which are used in gravity-separation processes. The term "heavy-media solutions" will be utilized herein to refer specifically to heavy liquids.

"Heavy-density" has heretofore been commonly utilized to refer to pulps consisting of a suspension of solid particle such as ferrosilicon, magnetite or galena in liquid. The term "heavy-media suspensions" will be utilized herein to specifically refer to pulps consisting of a suspension of solid particles in liquid.

In commercial heavy-media separations, starting material is fed into a separatory vessel containing a heavy medium maintained at a specific gravity intermediate between the specific gravities of the components to be separated. The components either sink or float in accordance with the gravimetric relationship between their specific gravities and the specific gravity of the heavy-medium.

In most cases, when the material is comminuted prior to treatment, the components of different densities are not completely liberated from each other. These partially liberated particles float or sink depending upon their average specific gravities. The partially liberated particles are commonly called "middlings."

The physical properties of the fluid medium play an extremely important role in the separation process.

The specific gravity of the medium is, of course, readily adjusted by proper selection of liquid and/or suspended particles. Particle density, shape, size, temperature of the medium, abrasion resistance and corrosion resistance are important factors to consider in relation to the preparation of a proper medium itself. Theoretically, as long as the specific gravity of the medium is intermediate between the specific gravities of the materials to be separated, the separation should be successful.

The tendency of the particles to settle in heavy-media suspensions is an important factor as is readily realized. This property is generally referred to as "stability." High stability (i.e. low settling rate) of the media is desirable. The stability is not simply a function of the relative density of the particles in relation to the liquid but rather is a complex function of particle density, shape and size of particle, surface tension, etc. which is not at present fully understood.

This theoretical analysis must be qualified. It has been found in practice that viscosity plays a major role in the success of heavy-media separation.

The viscosity of the fluid medium directly affects sharpness of separation, settling rates, decreases the minimum particle size that can be treated and decreases particle recovery from the media. For a detailed treatment of this subject, reference is made to U.S. Bureau of Mines Report of Investigation Nos. 3469R (1940) and 5354 (1957).

The term viscosity is generally used in relation to true solutions such as heavy-liquids. Apparent viscosity is the term generally used in relation to suspensions. Herein the term viscosity will be utilized in reference to heavy-media in general.

The initial viscosity of the media is generally controlled by the size and shape of the particles of the suspension at a given density. Temperature may have some small effect on the viscosity of the media.

When materials are applied to the media, several other factors will affect the viscosity of the media. Slime-forming constituents notoriously contribute to an increase in viscosity in heavy-media separations.

Slimes are commonly thought to be formed by fine particles of the order of below about 10 microns. Flat particles especially contribute to slime formation. The exact mechanism of slime formation is not fully known.

Notorious slime-forming materials include the clays and talcs. The particle size of clays is largely between 0.2 to 2 microns. Montmorillonite clays seem to have the greatest effect on viscosity. Kaolinitic clays and other clays are also highly slime-forming in addition to manganese slimes, wad, geothite, fine quartz and fine mica and others.

The most efficient screening and washing in present practice will not remove all of the slime-forming materials from comminuted materials.

Virtually all ores contain at least some of the above-mentioned slime-forming constituents in some proportion. Since the presence of a fraction of a percent slime-forming component in the heavy-media hinders the acquisition of optimum results, it is readily seen that the effect of slime formation on viscosity is a major factor in heavy-media separation.

Even in the unlikely event that the feed material contains none of the above-mentioned slime-forming materials, the starting material itself almost inevitably contains a portion of fine particles which cause slime-formation during separation. In addition, attrition between the starting-material particles and suspension particles and indeed attrition between the suspension particles themselves cause the formation of sufficient slime-forming particles to lower the efficiency of heavy-media separation. Also corrosion and chemical reaction of the suspension particles leads to increased viscosity.

The effect of increased viscosity leads to (1) a decrease in the sharpness of separation, (2) a decrease in percentage recovery of the valuable constituent of the ore treated, (3) an increase in minimum particle size which can be effectively treated and separated, (4) an increase in particle elutriation, and (5) a decrease in ease of media recovery in addition to several other deleterious factors commonly known in the art.

The term "particle elutriation" is commonly utilized in the art of heavy-media separation to indicate the tendency of fine particles to remain on the surface of the media even though the particle possesses the requisite density in relation to the density of the media to cause the particle to sink. Increased viscosity causes an increase in elutriation of particles which contributes to a decreased recovery of the ore values.

Accordingly, it is an object of the present invention to provide a process for the treatment of slime-forming materials in heavy-media separations.

It is a second object to provide an improvement in existing heavy-media separation processes whereby sharper separations are facilitated.

It is a third object to provide a process whereby the minimum particle size effectively treatable in heavy-media separation is reduced.

It is a fourth object to provide a process for heavy-media separation in which elutriation is reduced substantially.

It is a fifth object of the present invention to provide a process for hydro-cyclone separation of materials utilizing heavy-media.

It is a sixth object to provide a novel heavy-media which exhibits greater stability at a given density and viscosity.

Additional objects will be apparent from the remaining disclosure and appended claims.

The above-mentioned objects are achieved by the addition of a suitable dispersing agent to a heavy-media. The dispersing agent causes a decrease in slime-formation thereby substantially lowering the viscosity of the heavy-media. This allows effective and more selective separation in the presence of slime-forming contaminants. Proper control of the amount of dispersant added enables an artisan to treat high-slime materials while at the same time retaining a stable heavy-media, indeed in some cases the stability of the suspension is increased (e.g. the settling rate of the suspension is decreased).

Dispersing agents may be generally categorized by the mechanism facilitating dispersion. The three general categories may be referred to as charge-neutralization dispersants, surface-active dispersants and protective-colloid dispersants.

Charge-neutralization dispersants generally cause sequestration of ions controlling flocculation or slime formation. Examples of charge-neutralization dispersants include alkali phosphates, particularly, sodium pyrophosphate and trisodium phosphates, sodium hexametaphosphate, sodium silicate, caustic soda, tannis (e.g. quebracho) and ethylenediaminetetraacetic-acid.

Surface-active dispersants generally include lignin sulfonates, petroleum sulfonates and amines, long chain alkyl and aryl sulfonates such as polymerized potassium salts of alkyl naphthalene sulfonic acids, and amines.

Protective-colloid type dispersants include starches, gums, carboxymethylcellulose, sodium silicate and proteins.

Many dispersants may be catagorized in more than one category as for example sodium silicate. The above categories and examples of dispersants are not to be construed as limitative on the present process. Any dispersant whether falling within the above general categories or not is amenable for use in the present process.

The type and amount of dispersant employed in a specific heavy-media process is dependent on many factors such as the type of slime-forming material, the physical and chemical makeup of the media, the type of material treated, etc. In addition, the amount of dispersant which can be considered effective vary with the type of heavy-media and the type material treated. Each dispersant will exhibit a somewhat varying extent-of-dispersion in each particular situation.

Most beneficiation processes, including flotation, and heavy-media are notoriously sensitive to the above factors. It is virtually impossible to specifically disclose all the generally well known situations which can be envisioned in relation to the use of the present invention without resorting to prolixity. Heavy-media separation processes like flotation processes require preliminary or control tests before all the parameters entering into the successful operation of the process are known.

Accordingly, the following specific embodiments of the present invention will enable skilled artisans, by utilizing well known art and standard preliminary or control experimentation, to adapt the herein disclosed invention to heavy media preparation in general in the treatment of slime-forming materials.

The relationship between viscosity and the amount of a given dispersant for ferrosilicon heavy-media suspensions contaminated with bentonitic clay, kaolinite clay, talc and manganese slimes containing $MnO_2$ minerals, goethite, clay, quartz and mica at different specific gravities is shown below.

A Shelton-De Vaney capillary flow viscometer (e.g., refer to U.S. Bureau of Mines Investigation Report 5354, August 1957, for detailed discussion of operation of Shelton-De Vaney viscometer) was used to obtain the viscosity in various tests made with ferrosilicon suspensions. The comminuted ferrosilicon is normally 100-mesh x D material. Knapsack ferrosilicon is steam-shotted, spherical ferrosilicon. Contaminants used were kaolinite and bentonite clay, talc and manganese ore slimes. The manganese ore slimes consisted principally of $MnO_2$ minerals, goethite, clay, quartz and mica. At least some of these slime-causing mineral particles are associated with nearly all of the ores treated by heavy-media separation. The results are given in Tables I and II.

TABLE I

*Reduction in Viscosity Due to Sodium Hexametaphosphate Additions*

| Suspension | Suspension density | Viscosity initial | Viscosity, centipoises, with hexametaphosphate addition (percent by weight of solids) | | | | | | |
|---|---|---|---|---|---|---|---|---|---|
| | | | 0.01% | .012% | .016% | .047% | .05% | .14% | .24% |
| Shotted ferrosilicon with 10% manganese slimes | 3.3 | 38 | 26 | ------ | 19 | ------ | 18 | ------ | ------ |
| Shotted ferrosilicon with 1% Bentonite clay | 3.6 | 170 | ------ | 142 | ------ | 124 | ------ | 98 | 85-90 |

TABLE II

*Reduction in Viscosity Due to Sulfonate Additions Polymerized Potassium Salts of Alkyl Naphthalene Sulfonic Acids*

| Suspension | Suspension density | Viscosity initial | Apparent viscosity, centipoises Sulfonate additions | | |
|---|---|---|---|---|---|
| | | | 0.01% | 0.05% | .5% |
| Comminuted ferrosilicon with 10% Kaolinite Clay | 2.8 | 54 | 30 | 18 | ------ |
| Comminuted ferrosilicon with 5% Talc | 2.8 | 65 | 34 | 28 | ------ |
| Shotted ferrosilicon with 10% manganese slimes | 3.3 | 35 | ------ | 28 | 81 |

The data in Table I shows the effect of a charge-neutralization dispersant (sodium hexametaphosphate) as compared with the effect of a surface-active dispersant (polymerized potassium salts of alkyl naphthalene sulfonic acids) as shown in Table II. The charge-neutralization dispersant of Table I shows a stronger dispersing effect than the surface-active dispersant of Table II in this particular configuration. The general quantitative effect of these respective categories of dispersants will vary with type of slime-forming material. Both Tables I and II show that the addition of increasing amounts of each type of dispersant causes a decrease in viscosity. The relationship between the amount of dispersant and the viscosity is asymptotic approaching a minimum substantially the same for a given suspension and contaminant as noted by comparison of Table I and II. In the case of a shotted ferrosilicon-10 percent manganese slime system at a suspension density of 3.3, the asymptote appears to be about 18 centipoises.

It has been found necessary to exercise careful control of the reagent additions. While excessive dispersant additions will not give further lowering of the apparent viscosity, excessive reagent additions drastically increase the settling rate of the media suspension and thus would have a deleterious effect on ease of plant operation. It has been found that by careful dipsersant control, it is possible to achieve both a low viscosity and a stable suspension. This effect is illustrated in Table III. In this particular case, the settling rate actually passes through a slight minimum which incidentally corresponds to maximum obtainable viscosity lowering. The tests in Table III were made with shotted ferrosilicon contaminated with 10 percent manganese ore slimes at a media density of 3.3.

TABLE III

*Contamination Effect of Sodium Hexametaphosphate Dispersant Additions on Suspension Settling Rate*

| Suspension | Settling rate initial | Settling rates (cm./min.) hexametaphosphate additions | | | | |
|---|---|---|---|---|---|---|
| | | 0.008% | 0.016% | 0.05% | 0.1% | 0.5% |
| Uncontaminated suspension, cm./min. | 1.75 | ------ | ------ | ------ | ------ | ------ |
| Slime-contaminated suspension | 0.18 | 0.13 | 0.02 | 0.9 | ------ | 0.9 |

| | Initial viscosity | Viscosity centipoises | | | | |
|---|---|---|---|---|---|---|
| Viscosity of contaminated suspension under specified conditions | 38-35 | 27 | 19 | 18 | 18 | ------ |

Table III shows that the initial settling rate of an uncontaminated suspension is considerably higher (1.75 cm./min.) than the settling rate of a slime-contaminated suspension (0.18 cm./min.) at a given media density of 3.3. This effect is logical and predictable since the increased viscosity of the slime-contaminated suspension is greater than the viscosity of the uncontaminated suspension; therefore, the particles of the media will settle more slowly.

The novel nature of the media put forth here is evident from a comparison of settling rate versus viscosity measurements occasioned by the addition of the dispersant.

Note that the desired viscosity decrease is caused by the addition of the dispersing agent (viscosity of 38 centipoises asympototically decreases to a level of 18 centipoises) yet at the same time the settling rate of the media decreases from 0.18 cm./min. with no dispersant to the low value of 0.02 cm./min. at a viscosity of 19 centipoises. Further additions of dispersing agent reduce the viscosity asympototically to 18 centipoises while causing a rapid increase in the settling rate to 0.9 cm./sec. Note that the increased settling rate of the suspension is still one-half the settling rate of the uncontaminated suspension.

In general then, the desired low viscosity of the slime-contaminated media can be achieved by the addition of a dispersing agent while at the same time the settling rate of the media is low.

Furthermore, the judicious addition of the proper amount of dispersant enables an artisan to produce a suspension having maximum stability and a substantially maximum, desired, low viscosity.

It should be noted, that the addition of excess dispersing agent causes a rapid increase in the settling rate of the media itself. This effect is undesirable since suspension-stability is substantially lowered.

Practical use of the novel media is illustrated by the following examples and tables.

Two portions of chromite ore, the first comminuted to particle sizes of 1 x ¼ inch and the second to 3 x 10 mesh (3 mesh ~¼ inch and 10 mesh ~⅟₁₆ inch) were treated in an aqueous, shotted-ferrosilicon suspension of specific gravity 3.6 to recover the chromite component.

In tests 1 and 2, the ore was separated in the uncontaminated media; in tests 3 and 4 the media was purposely contaminated with about 1 percent bentonite clay; and tests 5 and 6 the contaminated media was treated with 0.2 percent sodium hexametaphosphate. The results are given in Tables IV and V. Table IV shows the results of 1 x ¼ inch chromite ore and Table V shows the result of 3 x 10 mesh chromite ore.

originally obtained in the uncontaminated media (test 1). Test 3, run in the contaminated media without dispersants was only 64 percent as effective as the original test.

In addition, it was observed that in the contaminated media the finer particles tended to report in the float (elutriate) even though their specific gravity was great enough so that they should have gone to the sink product. The use of the dispersing agent remedied this situation as is shown in Table VI. This decrease in elutriation is plainly illustrated in Table VII.

TABLE V

*Improvement of Heavy-Media Separations of 3 x 10 Mesh Chromite Ore by Use of Dispersant Additions*

| Test No. | Media | Apparent viscosity, centipoises Shelton-DeVaney | Product | Weight Percent | Percent $Cr_2O_3$ | Percent distribution |
|---|---|---|---|---|---|---|
| 2 | Uncontaminated | 11 | Sink at 3.6 | 52.6 | 49.7 | 60.7 |
|   |   |   | Float at 3.6 | 47.4 | 35.8 | 39.3 |
|   |   |   | Composite | 100.0 | 43.2 | 100.0 |
| 4 | Contaminated [1] | 170 | Sink at 3.6 | 38.9 | 45.9 | 41.3 |
|   |   |   | Float at 3.6 | 61.1 | 41.4 | 58.7 |
|   |   |   | Composite | 100.0 | 43.1 | 100.0 |
| 6 | do.[2] | 90 | Sink at 3.6 | 48.0 | 48.8 | 55.1 |
|   |   |   | Float at 3.6 | 52.0 | 36.7 | 44.9 |
|   |   |   | Composite | 100.0 | 42.5 | 100.0 |

[1] With 1% Bentonite.   [2] With 1% Bentonite plus 0.2% sodium hexametaphosphate.

In this test virtually no separation was achieved in the contaminated suspension. The use of the dispersant gave a recovery of chromium 92 percent as effective as that obtained in the uncontaminated media.

The invention was employed to improve the operation of a commercial heavy-media plant treating chromite ore. Immediate visual improvement in the operating conditions was noted and was verified by a series of tests following the initial application as demonstrated, by Table VI. Not only was an improvement in grade

TABLE IV

*Improvement of Heavy-Media Separations of 1" x ¼" Chromite Ore by Use of Dispersant Additions*

| Test No. | Media | Apparent viscosity, centipoises Shelton-DeVaney | Product | Weight Percent | Percent $Cr_2O_3$ | Percent distribution |
|---|---|---|---|---|---|---|
| 1 | Uncontaminated | 11 | Sink at 3.6 | 83.4 | 47.4 | 89.1 |
|   |   |   | Float at 3.6 | 16.6 | 29.2 | 10.9 |
|   |   |   | Composite | 100.0 | 44.4 | 100.0 |
| 3 | Contaminated [1] | 170 | Sink at 3.6 | 52.9 | 47.4 | 56.7 |
|   |   |   | Float at 3.6 | 47.1 | 40.5 | 43.3 |
|   |   |   | Composite | 100.0 | 44.2 | 100.0 |
| 5 | do.[2] | 90 | Sink at 3.6 | 76.8 | 47.6 | 82.7 |
|   |   |   | Float at 3.6 | 23.2 | 33.0 | 17.3 |
|   |   |   | Composite | 100.0 | 44.2 | 100.0 |

[1] With 1% Bentonite.   [2] With 1% Bentonite plus 0.2% sodium hexametaphosphate.

The use of only a small amount of dispersing agent (0.2 percent) results in an increased recovery in test 5. The recovery in test 5 is 93 percent as effective as was originally obtained in the uncontaminated media (test 1). Test 3, run in the contaminated media without dispersants was only 64 percent as effective as the original test.

of concentrate noted but, also, the addition of sodium hexametaphosphate was found to substantially improve the operation of the media cleaning circuit.

TABLE VI

*Effect on Grade of Chromite Concentrate by Size With Sodium Hexametaphosphate Additions to a Commercial HMS Unit*

AVERAGE OF THREE DAYS' RUN BEFORE USING SODIUM HEXAMETAPHOSPHATE

| Screen analysis | Percent weight | Percent Cr₂O₃ |
|---|---|---|
| +2″ | 20.9 | 44.4 |
| −2″ +1″ | 27.5 | 44.2 |
| −1″ +¾″ | 18.6 | 43.8 |
| −¾″ +½″ | 15.0 | 43.2 |
| −½″ +¼″ | 16.5 | 40.8 |
| −¼″ | 1.5 | 37.2 |

AVERAGE OF FOUR DAYS' RUN AFTER USING SODIUM HEXAMETAPHOSPHATE

| | | |
|---|---|---|
| +2″ | 26.5 | 44.6 |
| −2″ +1″ | 23.2 | 44.6 |
| −1″ +¾″ | 20.0 | 44.1 |
| −¾″ +½″ | 15.0 | 43.3 |
| −½″ +¼″ | 13.5 | 43.1 |
| −¼″ | 1.5 | 41.4 |

Table VI shows the increase in chromite recovery in the finer particle sizes. Previously, the fines did not separate pursuant to the difference between their specific gravity and the specific gravity of the media; rather, due to the reduced settling rate of the fine particles in viscous slime-contaminated suspensions, the fine particulate values which should have reported in the sink product floated with the gangue. The present novel process remedies this situation.

Table VII shows the effect of dispersants on elutriation of particles. The contaminant consists of bentonite clay. The feed material was the same as that utilized in Table IV. The chromite ore will report in the sink portion in accordance with its specific gravity in relation to the density of the heavy media.

TABLE VII

*Decrease in Particle Elutriation Due to Dispersant Additions*

| Ore particle size | Product | Test No. 3 before dispersant addition | Test No. 5 after dispersant addition (0.2% sodium hexametaphosphate) |
|---|---|---|---|
| 1″ x ¾″ | Sink | 32.4 | 40.5 |
|  | Float | 15.4 | 7.1 |
|  | Composite | 47.8 | 47.6 |
| ¾″ x ½″ | Sink | 21.4 | 37.8 |
|  | Float | 30.8 | 14.6 |
|  | Composite | 52.2 | 52.4 |

NOTE.—The above figures refer to weight percent ore.

The above data shows the decrease in elutriation of particles in slime-containing heavy-media. Two ranges of particle sizes are shown to indicate the relative effect of dispersants on each particle size range. It is evident that the use of a dispersant greatly decreases elutriation of particles of all sizes, particularly, the finer particles.

Manganese may be separated by the process of the present invention by preparing an aqueous heavy-media suspension of nominal 100 mesh by down ferrosilicon at a proper density ranging from 2.9 to 3.5. The exact density will depend upon the mineralogical composition of manganese ore and associated gangue. The slime-forming materials in manganese are largely clay, goethite and manganese ore slimes. The manganese ore is comminuted to approximately 1 inch by one-quarter inch and charged into the heavy-media suspension. A suitable and effective amount of dispersant is added and a separation exhibiting increased recovery of manganese values is effected.

Iron ore may be separated by the process of the present invention by preparing an aqueous heavy-media suspension of a mixture of nominal 100 mesh by down ferrosilicon and magnetite at a density ranging from about 2.7 to 3.5. The exact density will depend upon the mineralogical composition of the iron ore and the associated gangue materials. The slime-forming materials in iron ore are largely clay and limonitic components. The iron ore is comminuted to sizes ranging as high as six inches but frequently in the range of one-quarter to two inches and charged in the heavy-media suspension. A suitable and effective amount of dispersant is added and a separation exhibiting increased recovery of the iron component of the ore is effected.

Coal may be separated by the process of the present invention by preparing an aqueous heavy-media suspension of 325 mesh by down magnetite at a density ranging from about 1.4 to 1.8. The slime-forming material associated with coal is largely clay and coal fines. The coal is comminuted to a size sufficiently small to liberate most of the associated gangue and charged into the heavy-media suspension. A suitable and effective amount of dispersant is added and a separation exhibiting increased recovery of coal values is effected.

Sand and gravel may be cleaned and separated from various gangue constituents such as quartz and slate by preparing an aqueous heavy-media suspension of nominal 100 mesh by down ferrosilicon at a density of approximately 2.65. The slime-forming constituents associated with sand and gravel are the soils. The sand and gravel are the soils. The sand and gravel is charged into the heavy-media suspension. A suitable and effective amount of dispersant is added and a separation exhibiting increased recovery of sand and gravel values is effected.

Accordingly, it is readily seen that the herein described novel invention can be utilized on a wide variety of ores. The novel process is not limited to the herein-disclosed embodiments but is amenable for use on all ores treatable in heavy-media separation processes.

A recent innovation in the field of heavy-media separation is the use of cyclone separators to increase the separation rate and decrease the effective minimum size treatable in heavy-media processes. The work done in this vein is described in detail in two articles by E. C. Herkenhoff in Engineering and Mining Journal, volume 154, Nos. 8 and 9, pages 33 and 95 respectively.

The present invention is amenable for use in such hydro-cyclone heavy-media separation to decrease the deleterious effect of slime-formation on the sharpness of recovery of values.

The present invention may be utilized in hydro-cyclone heavy-media separation processes by preparing a suitable heavy-media suspension of the materials herein disclosed and of a proper density in relation to the ore being treated. A suitable amount of dispersing agent and comminuted ore is added to the heavy-media suspension prior to treatment in the cyclone separator. The heavy-media containing dispersants and ore plus gangue is charged into the cyclone and subjected to hydrocyclonic action. The use of the dispersant will cause increased recovery due to sharper separation facilitated by the action of the dispersant on the slime-forming materials in the heavy-media mixture being treated.

In addition the present invention is amenable for use in other gravity concentration methods including jigging operations. When the invention is employed in jigging operations, the standard methods of jigging by standard jigs is not altered. An artisan simply adds an amount of dispersing agent to the heavy-media suspension containing the material to be jig-fractionated. The use of the dispersant results in increased recovery of the value fraction from starting materials.

The novel media and a novel heavy-media separation process disclosed herein generally causes; (1) an increase in the sharpness of separation; (2) an increase in the percentage recovery of the valuable constituent of the ore treated when slimes are present; (3) a decrease in the minimum ore particle size that can be effectively treated and separated; (4) a lowering of particle elutriation; (5) an increase in the ease and amount of media recovery; (6) an increase in plant capacity and ease of control of plant operations; and (7) a low media settling rate is obtained with low viscosity.

What is claimed is:

1. In heavy-media suspension processes for the fractionation and recovery of comminuted materials wherein the comminuted materials are charged into a slime-containing heavy-media suspension maintained at a specific gravity intermediate between the specific gravities of the components of the comminuted materials whereby a float and a sink product is fractionated, the improvement comprising adding to said heavy-media suspension sodium hexametaphosphate in an amount between about 0.008 and about 0.2 percent by weight of the solids in said suspension.

2. In heavy-media suspension separation processes for the fractionation and recovery of chromium oxide from comminuted chromium ore wherein the comminuted chromium ore is charged into a heavy-media suspension maintained at a specific gravity intermediate between the specific gravities of the chromium oxide and the gangue of the chromium ore whereby a float and a sink product is fractionated and wherein the heavy-media separation circuits contain slime, the improvement comprising adding to said heavy-media suspension sodium hexametaphosphate in an amount between about 0.008 and about 0.2 percent by weight of the solids in said suspension.

References Cited in the file of this patent

UNITED STATES PATENTS

| | | |
|---|---|---|
| 2,108,495 | Levin | Feb. 15, 1938 |
| 2,140,899 | Davidson | Dec. 20, 1938 |
| 2,309,931 | Cameron | Feb. 2, 1943 |
| 2,333,347 | Trostler | Nov. 2, 1943 |
| 2,393,160 | Harder | Jan. 15, 1946 |
| 2,868,618 | Oberg | Jan. 13, 1959 |
| 2,899,392 | Schranz | Aug. 11, 1959 |
| 2,932,395 | Marot | Apr. 12, 1960 |

FOREIGN PATENTS

| | | |
|---|---|---|
| 830,341 | France | May 9, 1938 |